Aug. 19, 1958 E. K. PENDERGRASS 2,848,215
CUTTING MACHINE FOR CURVED PIPE
Filed Aug. 8, 1956 2 Sheets-Sheet 1

INVENTOR.
Earl K. Pendergrass
HIS ATTORNEYS

Aug. 19, 1958 E. K. PENDERGRASS 2,848,215
CUTTING MACHINE FOR CURVED PIPE
Filed Aug. 8, 1956 2 Sheets-Sheet 2
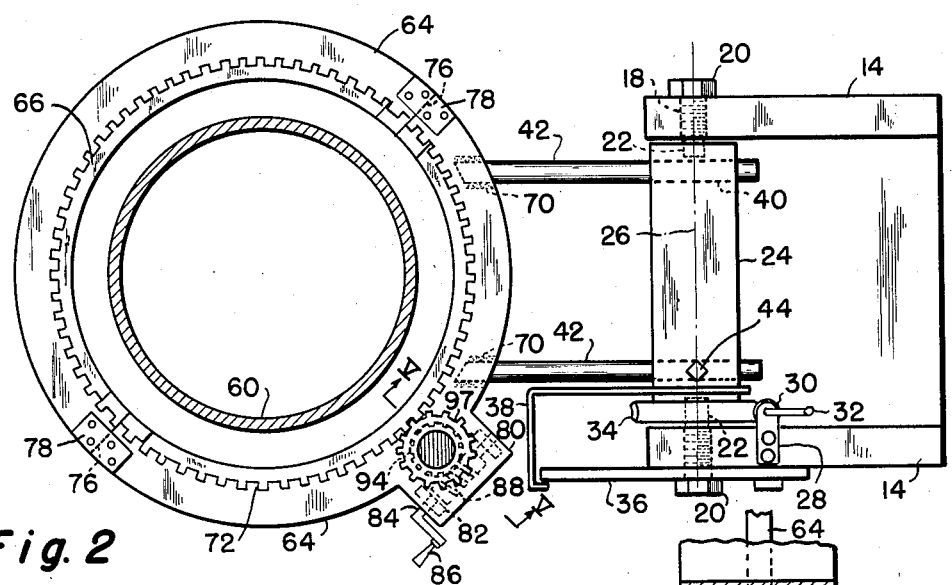
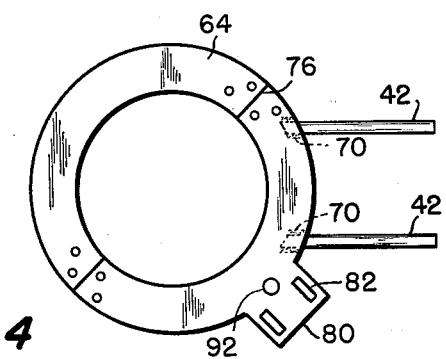
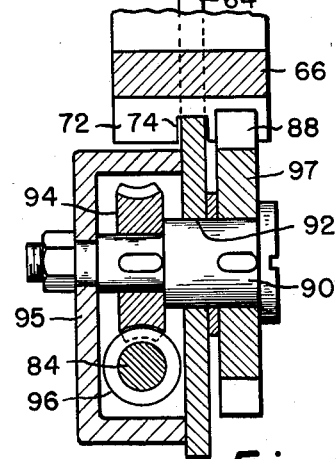
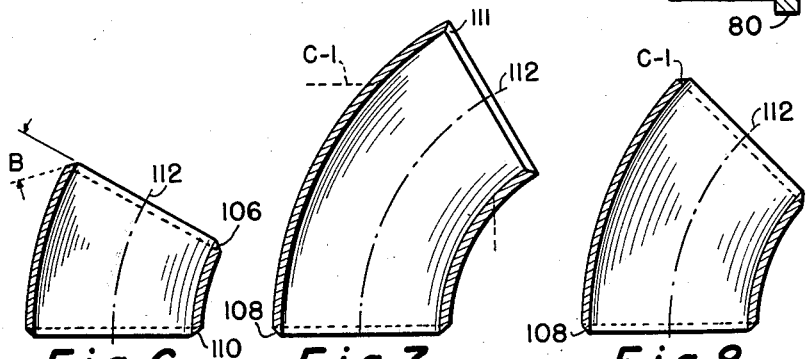
INVENTOR.
Earl K. Pendergrass
BY Webb, Mackey & Burden
HIS ATTORNEYS

United States Patent Office 2,848,215
Patented Aug. 19, 1958

2,848,215

CUTTING MACHINE FOR CURVED PIPE

Earl K. Pendergrass, Canonsburg, Pa.

Application August 8, 1956, Serial No. 602,730

8 Claims. (Cl. 266—23)

The present invention relates to a pipe cutting machine for curved pipe and more particularly to an oxyacetylene flame cutting machine in which weld elbows may be divided and the edges thereof simultaneously beveled in the field whereby a tube turn such as a 90° elbow for welded pipe systems may be divided into two 45° elbows or three 30° elbows or the like.

The popularity of welded pipe systems accounts for the fact that weld elbows are replacing the larger pipe fittings universally and particularly in the oil and gas industry. Despite this fact, weld elbows of angles other than 90° are not stocked universally and because of the large range of pipe sizes it would require an enormous stock in order to maintain a supply of weld elbows of all angles desired. Weld elbows of odd angles are particularly useful where long strings of straight pipe are employed in the field and where only slight angularity due to the terrain is necessary in the joints between consecutive strings of the pipe. The present invention contemplates a machine or tool with which weld elbows may be cut and beveled in the field making it necessary to stock only 90° elbow or turn fittings or at the most 90° and 180° fittings.

The machine provided by this invention is particularly adapted to receive and hold weld elbows for the cutting and beveling operation and the essential component parts thereof are readily adjustable to accommodate weld elbows of different diameters and bend radii and also adjustable for cutting weld elbows to different degrees or lengths. A novel torch holding means is provided which may be rotated for cutting through the wall of a fixed elbow or turn continuously through 360° with the cutting torch always arranged at the same cutting angle relative to that wall.

In accordance with this invention for cutting curved pipe elbows or turns, a flame cutting machine is provided in which the elbow is rigidly fixed and in which the cutting torch revolves thereabout continuously through 360° to make a complete cut. More specifically, the machine has a stand presenting a base platform, a pipe stool supported thereon to hold the curved elbow or pipe erected in predetermined disposition at a fixed location on the platform, a ring assembly adapted to carry the cutting torch and having swinging support arms swingably mounted upon the base platform to support the ring assembly concentrically about the pipe, the cutting torch being carried by one ring of that assembly, drive means meshing with teeth on the torch carrying ring to rotate the torch through a path of revolution about the pipe, a rocking member in which the fixed end of the indicated swinging support arms is shiftably mounted for adjustably fixing their lengths, and adjusting means drivingly connected to said rocking member to control its rocked position so as to swing said arms and hold the ring assembly and torch in an adjusted position about the pipe along which the torch will travel. To fix a piece of curved pipe, and to provide a cutting torch which rotates thereabout with machine-like accuracy is believed to be a basically novel approach to the field problems with welded pipe systems.

Further features, objects and advantages will either be specifically pointed out or become apparent when for a better understanding of the invention reference is made to the following description taken in conjunction with the accompanying drawings in which:

Figure 2 is a transverse sectional view taken along the section lines II—II of Figure 1;

Figures 3 and 4 are fragmentary views of portions of Figures 1 and 2 respectively with certain parts removed in Figure 4 for the sake of clarity;

Figure 5 is a sectional view taken along the lines V—V of Figure 2; and

Figures 6, 7, and 8 are sequential views of a section of curved pipe in stages of its division within the present machine.

Figure 1:
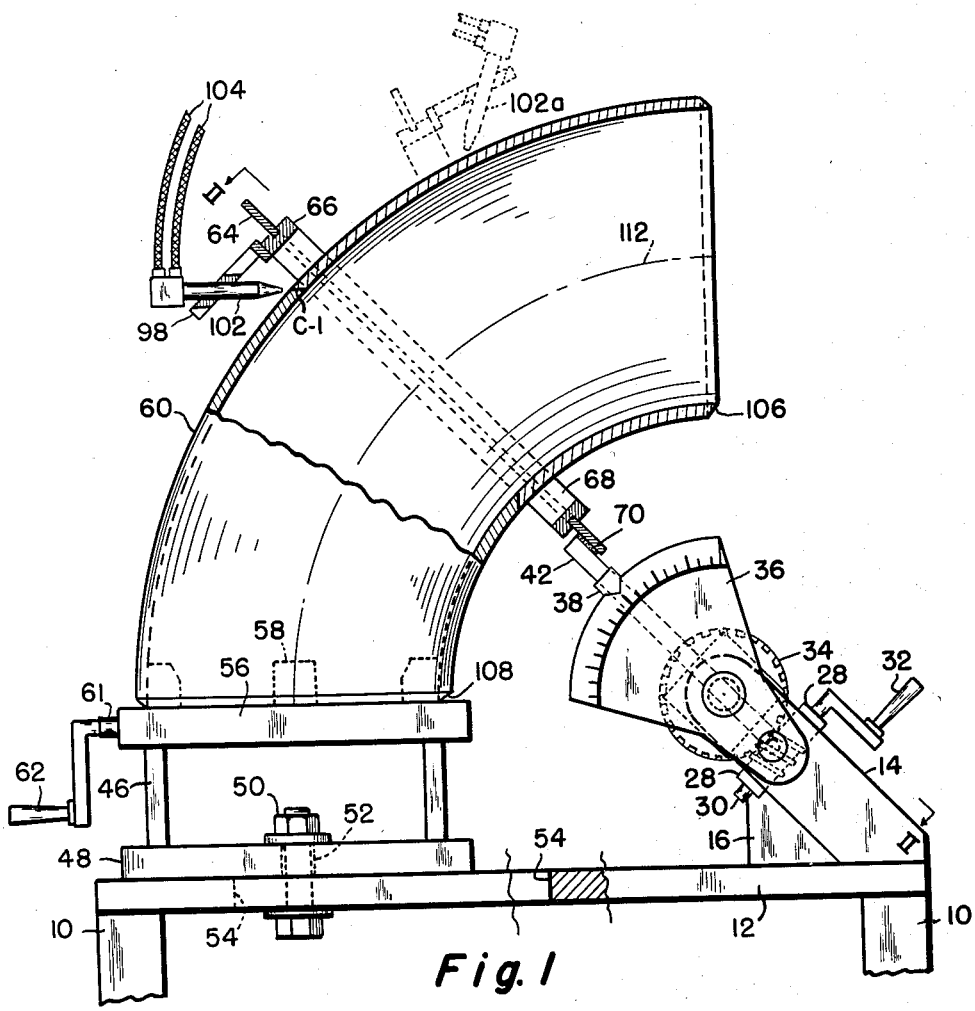
Figure 1 is a side elevational view of a cutting machine illustrating a preferred embodiment of the invention.
Figure 3:
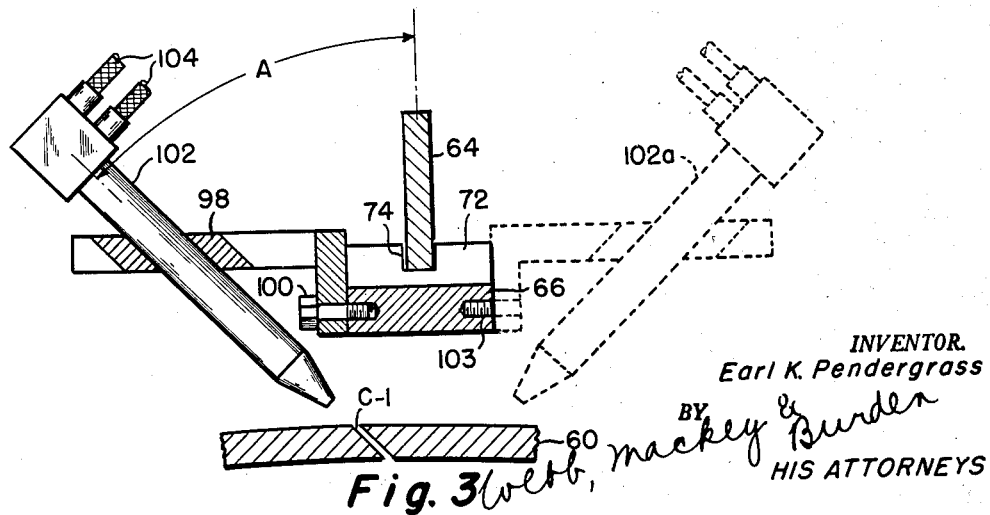

In Figures 1 through 5 which illustrate a preferred embodiment of the invention, the flame cutting machine includes a stand 10 of rectangular shape having four legs arranged at the corners thereof to support a base platform 12. At one end the platform carries a pair of fixed, inwardly directed upstanding arms 14 supported on a common wedge block 16 such that they extend in parallel relationship diagonally with respect to the base platform 12. The fixed arms 14 have registering openings 18 extending transversely through their upper ends each of which receives a heavy cap screw 20 presenting a stub journal or trunnion 22 of reduced diameter at the inner end thereof. A metal block 24 of generally rectangular cross section is mounted at its opposite ends upon the trunnions 22 for rocking movement about a fixed horizontally extending trunnion axis 26. One of the fixed arms 14 carries a pair of spaced bearing plates 28 provided with shaft openings in which a worm shaft 30 is journaled to rotate. The shaft 30, which may equally well be power operated, is operated by a hand crank 32 as illustrated to provide the input shaft of a worm and worm wheel mechanism 34 which solidly engages metal block 24 at one end. Rotation of the input shaft 30 causes the metal block 24 to rock into adjusted positions about the trunnion axis 26 and the arm 14 which carries the shaft 30 also carries a fixed sector 36 with angular indicia thereon which cooperates with a stiff pointer 38 carried by the block 24 so as to indicate the angular position of the block relative to the horizontal. The angular position illustrated in Figure 1 is 45° above the horizontal.

The block 24 has a pair of spaced transverse bores 40 therein which slidably receive the inner end of a parallel pair of swingable, ring supporting arms 42. A bind screw 44 in the block 24 secures the ring supporting arms 42 at a predetermined fixed length of swing relative to the block 24 and to the trunnion axis 26.

At a point on the support platform 12 spaced from the pairs of fixed and swinging arms 14, 42, a pipe stool 46 is provided having its base 48 secured to the platform by means of one or several hold-down bolts 50 as necessary. Each of the bolts 50 passes through a circular opening 52 in the stool base 48 and a lengthwise extending slot 54 in the base platform 12 so as to be adjustable toward and away from the fixed trunnion axis 26. A chuck plate 56 at the top of the stool 46 is arranged in horizontal alignment with that trunnion axis 26 and carries a set of three or more chuck jaws 58 which separate from one another inside a curved pipe elbow 60 so as to grip the lower end thereof securely to the chuck plate 56. One or more input shafts 61 connected between appropriate hand cranks 62 and suitable chuck driving mechanism in the chuck plate 56 coordinate the movements of the jaws 58 outwardly in a circle with respect to one another.

A ring assembly consisting of a supported outer ring 64 connected to the arms 42 and a torch connected inner ring 66 surrounds the pipe elbow 60 and is of a size to provide a continuous radial clearance space 68 concentrically therebetween. More specifically, the supported outer ring 64 has a point on its underside welded at 70 to each swinging outer end of the individual swinging arms 42. The torch connected ring 66 in the assembly carries a continuous set of external bull gear teeth 72 which are successively milled with a continuous slot 74 cut between their opposite ends to form a guided joint connection slidably receiving the arm connected outer ring 64 which is disk shaped. This disk-shaped, arm connected ring 64 is fabricated from two halves diametrically split at 76 and bolted together through a set of fastening plates 78, Figure 2. The arm connected ring 64 has a radial extension 80 on one of the halves carrying a pair of bearing plates 82 welded thereto. A shaft 84 journaled in registering openings in the bearing plates 82 is power operated if desired but as illustrated carries a hand crank 86. The shaft 84 forms an input shaft to a worm and worm wheel drive mechanism 88 which meshes with the external teeth 72 on the torch connected ring 66.

The worm and worm wheel drive mechanism 88 is more particularly shown in Figure 5 in which the radial extension 80 on the outer arm connected disk 64 carries a cross shaft 90 in an opening 92 therethrough. At one end the cross shaft is journaled in and fastened by a nut to a mechanism cover 95 secured to the extension 80. The cross shaft 90 carries a worm wheel 94 adjacent that end which meshes with a worm 96 on the input shaft 84. Also, the cross shaft 90 carries a drive pinion 97 at its opposite end which is in continual mesh with the external teeth 72 on the torch connected ring 66.

The torch connected ring 66 has a reversible torch holding fitting 98 secured thereto by means of a set of bolts 100 for supporting an oxyacetylene torch 102. Owing to the reversibility of the torch holding fitting 98, the torch 102 may be moved into dotted line position 102a Figures 1 and 3 on the opposite side of the plane of the ring and for this purpose the ring 66 has a companion set of threaded openings 103 for the bolts 100 at that side. Suitable oxygen and acetylene gas hoses 104 supply the necessary cutting flame fuel to the torch to perform a line of cut generally indicated at C1 in Figures 1 and 3. It will be particularly noted in Figure 1 that the curved pipe elbow 60 initially carries factory formed outside bevels 106, 108 at its opposite ends. In conformity therewith for subsequent bevels, the torch 102 is held at an angle A, Figure 3 which roughly corresponds to the 37½° angle of outside bevel initially provided on these elbows. This 37½° angle is generally uniform for all thicknesses of curved pipe elbows which are to be ultimately acetylene welded into pipe systems. This same angularity of bevel applies to curved pipe elbows which are electric welded into systems having ¾" or thinner walls. In case a curved pipe elbow is contemplated for use in an electric welded system having pipe thicknesses of ¾" and above, the angle A is correspondingly adjusted to the desired 20° angularity relative to a diameter through the pipe.

In the operation of the present pipe cutting machine, reference may be had to Figures 1, 2, in conjunction with Figures 6 through 8. From the position of the torch shown by the dotted lines 102a in Figure 1, a 30° end portion of the pipe elbow 60 may be severed and removed to produce the article of Figure 6 complete with a newly formed 37½° bevel 110 at the severed lower end. Therefore this bevel corresponds to the bevel 106 which according to the angle B equals approximately 37½°. The severing is completed without physically touching or disturbing the stability of the pipe elbow 60 which is contacted only by the rotating cutting flame. By means of the end crank 32 the input shaft 30 is then rotated so as to lower the assembly of rings 64, 66 to the solid line position shown in Figure 1 for operating upon the remaining length of the pipe shown according to Figure 7. Inasmuch as this length of pipe remains with an unwanted internal bevel 111 left by the 30° length of Figure 6 another flame cut is made along the dotted line C1 by rotating the torch 102 continuously through 360° travel about the ring assembly. Slow, steady operation of the worm and worm wheel drive mechanism 88 accomplishes this rotative operation which the torch readily accommodates by twisting its flexible hoses 104 supplying the oxyacetylene gas thereto. The resulting article after the cut C1 is the 45° elbow according to Figure 8 retaining the original factory-made external bevel 108 at its lower end and having a newly formed bevel along the line of cut C1. Bevels are important in these pipe systems in providing a space for the weld metal when the pipe elbow is joined to a straight section in a weld-fabricated system.

A combination of factors make it highly desirable that the ring assembly which carries the torch holding fitting 98 have no supporting legs or other members in physical contact with the pipe elbow 60 being cut and that a fully unobstructed clearance space 68 be present at all times between the two while the torch 102 is revolving in its cutting path of revolution. First, it must be borne in mind that the pipe stool 46 is shifted in setting up the pipe 60 in erected position until the respective squared ends thereof are aligned horizontally and vertically with respect to the center of swing of the arms 42 as defined by the fixed horizontal trunnion axis 26. This alignment can be readily accomplished through loosening and retightening the hold-down bolts 50 and thereafter the binding screw 44 is adjusted to bring the ring assembly into a concentric position relative to the longitudinal center line of the pipe indicated at 112. Therefore, at these squared ends and at all intermediate points therebetween, the plane of the ring assembly as it shifts is always normal to the surface of the pipe elbow 60 and the ring assembly is continually held concentric to the longitudinal center line 112 and normal thereto. Consequently, if the path of cut of the torch 102 is confined substantially to this normal plane it will inherently leave a severed beveled end on the pipe which is square to the pipe section which carries it and thus the torch is desirably directed toward the plane of the ring with the flame describing a path generally in the clearance space 68 and impinging on the pipe in a line of cut C1 substantially in the plane of the ring assembly. More particularly, the ideal and preferable arrangement is to have the circular line of cut C1 aligned with the plane of the swinging arms 42 whose axes intersect the trunnion axis 26 as indicated and exactly straddle the longitudinal center line 112 of the elbow. The present apparatus therefore cuts the pipe to any arc at diametric angles for all odd angle turns which will still align perfectly. Moreover, the indicated arrangement whereby the pipe lacks direct connection with the ring assembly accounts for the further fact that its severed end (Figure 6) is readily removed without carrying with it, or in any manner disrupting, the ring assembly or torch indicated by the dotted lines 102a in Figure 1. Consequently, the torch holding fitting and the torch 102 are versatile to the point that the torch readily severs off unsupported end parts of a piece of curved pipe or elbow in a manner to provide an outside bevel at the line of severance on that end part. It will be appreciated that the pipe elbow 60 is always set up so that the vertical plane containing the longitudinal center line 112 thereof is exactly normal to the trunnion axis 26 and the latter axis forms the center of the arc of the pipe elbow 60.

As herein disclosed the invention is shown in a machine particularly adapted for cutting and beveling 90° weld elbow fittings. It is evident that the present machine is equally advantageous for use in sub-dividing 180° turns and any sub-multiple of the 180° and the 90° fittings.

So also the drawing shows the torch rotating mechanism 88 mounted to a separate side extension 80 on one of the ring halves but if preferable it can be mounted to one of the fastening plates 78 holding the ring 64 together. The illustrated machine has a single ring assembly versatile to the point of accommodating 12" elbows having bend radii of both 12" and 18", 10" elbows having bend radii of both 10" and 15", and 8" elbows with a 12" bend radius, and providing an approximate 37½° outside bevel thereupon. It is apparent that graduated sets of substitute rings may be utilized in the illustrated machine to handle other sizes of weld pipe fittings and that substitute torch holding fittings can be provided for odd size bevels, for instance 20° outside bevels. In the latter regard a swivel type torch holding fitting may be utilized instead of the fitting 98 to give a universal range of bevel angles as appropriate.

Variations within the spirit and scope of the invention described are equally comprehended by the foregoing description.

I claim:

1. A flame cutting machine for curved pipe comprising a stationary support for holding a curved pipe elbow in a fixed erected position, support arms mounted to swing to adjusted positions about a substantially horizontal axis, a ring assembly securely welded to the swinging ends of said arms so as to surround the pipe and carrying torch holding means mounted to travel thereupon in a path of revolution about the pipe, parts connected to form a mutual joint therebetween through which the horizontal axis aforesaid passes comprising a supporting part and a relatively movable arm-support rockable thereon about said axis, said arm-support having adjustable means of connection to at least one of said arms to shift the ring assembly both in its own plane and in a direction substantially normal thereto.

2. Apparatus having a pair of relatively shiftable supports arranged thereon with one adapted to hold a curved elbow in an erected position, traveling torch holding means having swinging arms connected to and supporting the same from their outer ends, a block having a slide connection to the inner end of said swinging arms enabling the latter to adjust the torch holding means in the plane of travel thereof, and having a trunnion joint connecting it to said other support, means operative at said slide connection to hold the arms fast to said block to fix the adjusted position of travel of the torch holding means at a fixed effective length for those arms, and means operable to rotate said trunnion joint to different positions of adjustment and effective to hold the block fast in the position of relative rotation assumed thereby upon said other support.

3. A flame cutting machine for curved elbows comprising a stationary support for holding a curved elbow in an erected position, support arms mounted to swing to adjusted positions about a substantially horizontal axis, a ring assembly securely welded to the swinging ends of said arms so as to surround the pipe and carrying torch holding means mounted to travel thereupon in a path of revolution about the pipe, parts connected to form a mutual joint therebetween through which the horizontal axis aforesaid passes comprising a supporting part and a relatively movable part supported thereon, said relatively movable part constituting an arm-support connected to said arms and rockable on said swing axis thereof to swing the ring assembly in a path in which the plane of the assembly remains normal to the curved center line of the curved elbow at all times, said joint forming parts including further means at the joint operable to rotate said joint to different positions of adjustment and effective to hold said joint locked fast in the adjacent position of relative rotation assumed thereby.

4. In an elbow dividing apparatus, means for mounting a torch ring concentrically to the elbow for movement about a fixed offset axis, and comprising arms supported in spaced apart relation, a trunnion block having means including mounting apertures for securing same by a joint to said arms for rotation on an axis extending longitudinally of said block and substantially aligned with said offset axis, slide rod means poking through individual apertures in said trunnion block and having outwardly extending end portions integral therewith for attachment to said torch ring, means releaseably holding said slide rod means for differing positions of adjustment of said torch ring toward and from a fixed axis in a plane common thereto, and means whereby angular adjustment of said rotatable block is precisely established comprising a coaxial gear means meshing with toothed input drive means and solidly engaging said block at a point adjacent one of said mounting apertures to operatively rotate said joint to different positions of precisely measured angular adjustment as aforesaid and effective to hold said joint locked fast as said measurement is established.

5. In an elbow dividing apparatus, means for mounting a torch ring concentrically to the elbow for up and down swinging movement about a fixed offset horizontal axis, and comprising arms supported in spaced apart relation, a trunnion block having means including longitudinally disposed mounting apertures for securing same through a joint to said arms for rotation on an axis extending longitudinally of said block and substantially aligned with said offset axis, a plurality of transversely disposed apertures formed in said trunnion block, individual slide rod means poking the transversely disposed apertures in said trunnion block and having outwardly extending portions integral therewith for attachment to said torch ring, means releaseably holding said slide rod means for differing positions of adjustment of said torch ring toward and from said fixed axis in a plane common thereto, and means whereby angular adjustment of said rotatable block is precisely established and operative in combination with further means operable to rotate said joint to different positions of precisely measured angular adjustment as aforesaid.

6. In a curved elbow dividing apparatus, means for mounting a torch ring concentrically to the elbow for up and down swinging movement about a fixed offset horizontal axis, and comprising arms supported in spaced apart relation, a trunnion member mounted to said arms for rotational movement on a fixed axis coincident with said offset axis, a plurality of transversely disposed apertures formed in said trunnion member, individual slide rods poking through said transverse apertures in the trunnion member and having outwardly extending end portions integral therewith for attachment to said torch ring, means including a binding screw intersecting one of said transverse apertures and releaseably holding the associataed slide for differing positions of adjustment of the slide rods and said torch ring toward and from said fixed axis in a plane common thereto, and means whereby angular measurement of said rotatable trunnion member is precisely established including means operable to rotate said joint to different positions of precisely measured angular adjustment as aforesaid.

7. In a curved elbow dividing apparatus, means for mounting a torch ring concentrically to the elbow for movement about a fixed offset axis comprising arms supported in spaced apart relation, a trunnion member having means including mounting apertures for securing same through a joint to said arms for rotation on an axis extending longitudinally of said trunnion member and coinciding with said offset axis, rod means slidably mounted in individual apertures in said trunnion member and having outwardly extending end portions integral therewith for attachment to said torch ring, means releasably holding said slide rod means for differing positions of adjustment of said torch ring toward and from said fixed axis in a plane common thereto, and means whereby angular adjustment of said rotatable trunnion member is precisely established comprising gear means meshing with toothed input drive means and solidly engaging a portion of said trunnion member adjacent one of said mounting apertures to operatively rotate said joint to different positions of precisely measured angular adjustment as aforesaid and effective to hold said joint locked fast as said measurement is established and a part connected to said trunnion member for simultaneous movement in a path adjacent a fixed part which cooperates therewith and one of which bears angularity indicia.

8. An elbow cutting machine comprising means for mounting a bipartite torch ring concentrically of the elbow for up and down swinging movement about a fixed offset horizontal axis, and including arms supported in spaced apart relation, one of said torch ring parts being rotatable relative to the other, a movably mounted support on said machine adapted to hold a curved elbow workpiece in an erected position, said rotatable torch ring part having separate reception portions provided thereon at opposite sides of the plane of said bipartite torch ring, a reversible torch holder fitting having disconnectable means of attachment to said reception portions for holding a torch facing said ring from either side so as to selectively reverse its angle to the workpiece, a trunnion member secured through a joint to said arms for rotation on an axis extending longitudinally of said trunnion member and substantially aligned with said offset axis, rod means slidably mounted in individual apertures in said trunnion member and having outwardly extending end portions integral therewith for attachment to said torch ring, means releasably holding said rod means for differing positions of adjustment of said torch ring toward and from said fixed axis in a plane common thereto, and rotary drive means whereby angular measurement of said rotatable trunnion member is precisely established comprising gear means operable to rotate said joint to different positions of adjustment and effective to hold said joint locked fast in the adjusted position of relative rotation assumed thereby.

References Cited in the file of this patent

UNITED STATES PATENTS

| | | |
|---|---|---|
| 1,692,625 | Brown | Nov. 25, 1928 |
| 1,907,957 | Gerber | May 9, 1933 |
| 2,061,442 | Summens | Nov. 17, 1936 |
| 2,082,967 | McKierman | June 8, 1937 |
| 2,459,823 | Lebedeff | Jan. 25, 1949 |
| 2,464,444 | Gantz | Mar. 15, 1949 |
| 2,623,285 | Marinovich | Dec. 30, 1952 |
| 2,623,742 | Livesay | Dec. 30, 1952 |
| 2,652,243 | Reed | Sept. 15, 1953 |
| 2,740,621 | Way, Jr. | Apr. 3, 1956 |

FOREIGN PATENTS

| | | |
|---|---|---|
| 412,788 | Germany | Apr. 27, 1925 |